United States Patent [19]

Franklin

[11] Patent Number: 5,072,798
[45] Date of Patent: Dec. 17, 1991

[54] CRANE SCALE LOAD RECORDING DEVICE

[76] Inventor: Samuel H. Franklin, Box 470181, Tulsa, Okla. 74147

[21] Appl. No.: 587,727

[22] Filed: Sep. 25, 1990

[51] Int. Cl.[5] .................. G01G 19/14; G01G 23/18
[52] U.S. Cl. ................................ 177/147; 177/45; 364/567
[58] Field of Search ............... 177/45, 147; 364/567

[56] References Cited

U.S. PATENT DOCUMENTS 4,969,112 11/1990 Castle .................................. 364/567

Primary Examiner—George H. Miller, Jr.
Attorney, Agent, or Firm—Head & Johnson

[57] ABSTRACT

A scale having a weight determining element having means to support the elements and means for engaging and suspending a load so that the weight of the load is measured, digital data storage within the weight determining element, a beam sensor in the weight determining element and a beam transmitter operable by a user to signal the weight determining element for temporarily recording a measured weight, a data storage device external of and separate from the weight determining element interconnectable with the weight determining element so that, upon command, the data stored in the weight determining element is transmitted to the data sotrage for use in a printer or for further data processing.

9 Claims, 2 Drawing Sheets

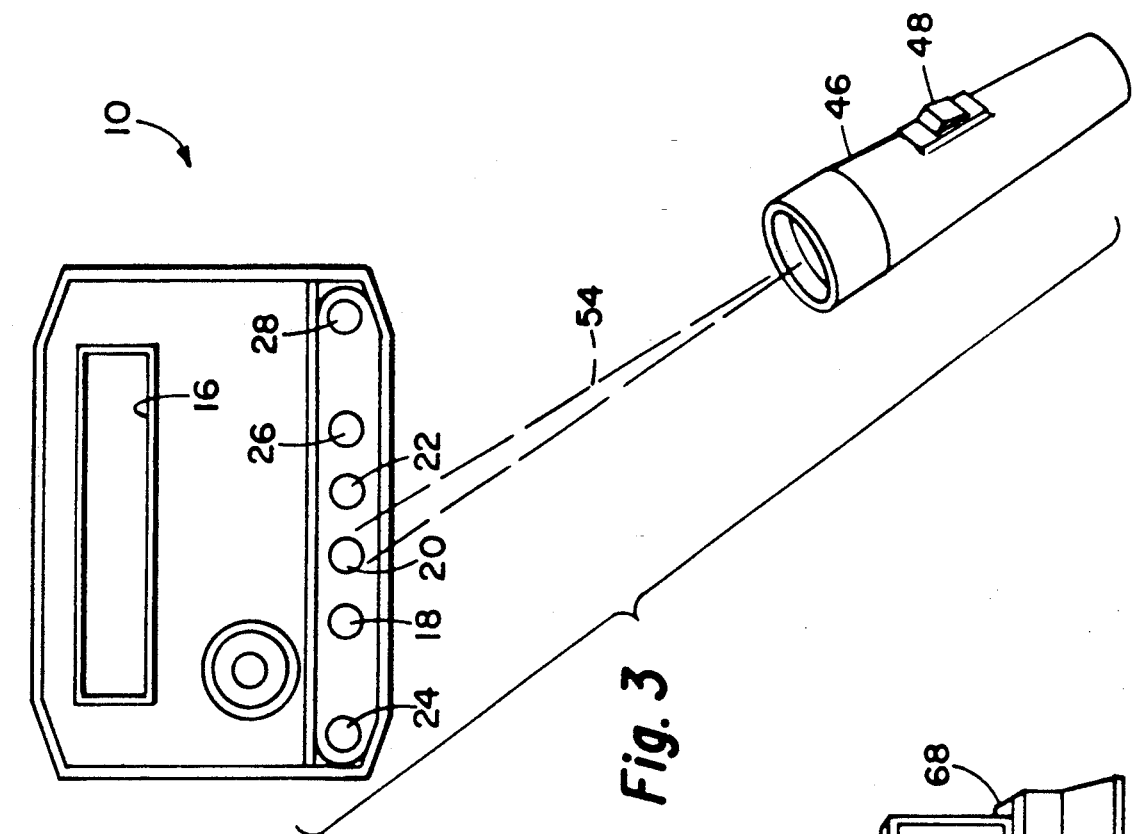
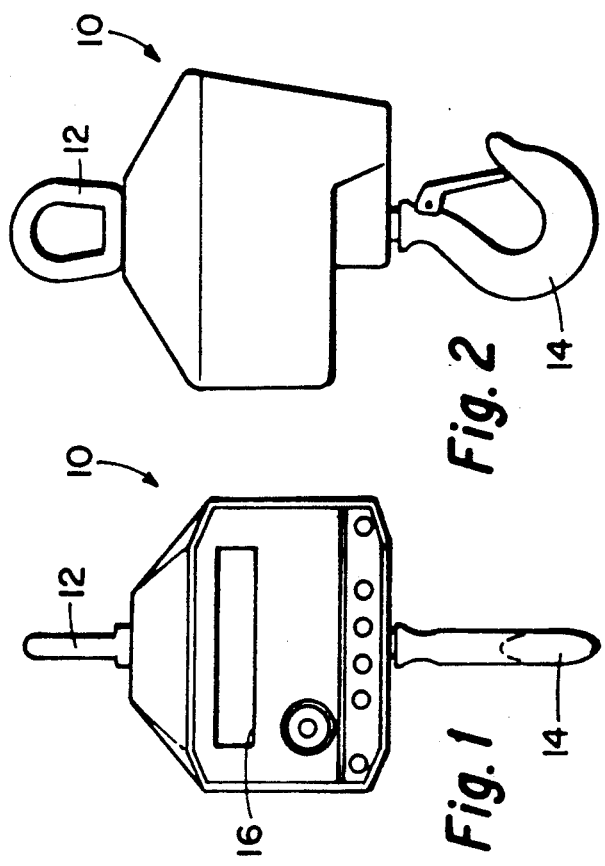
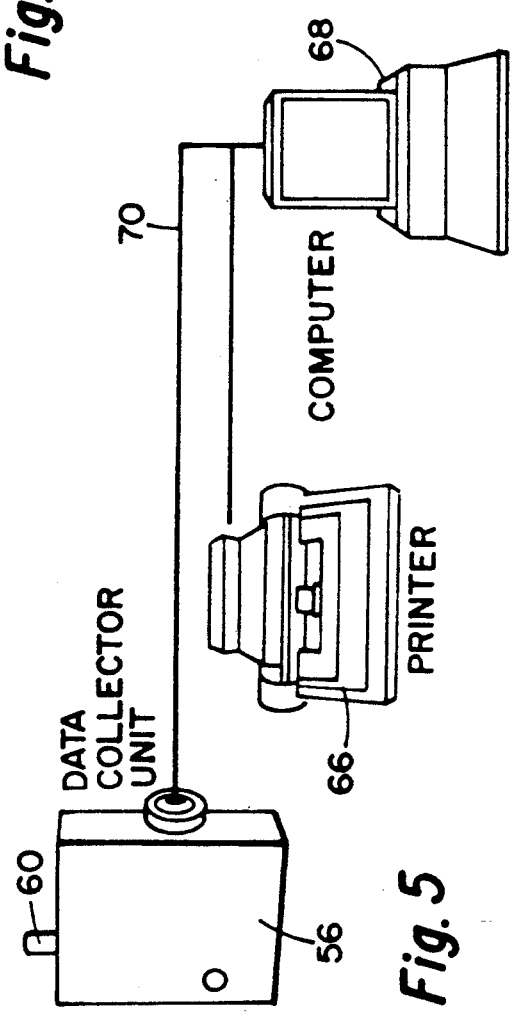

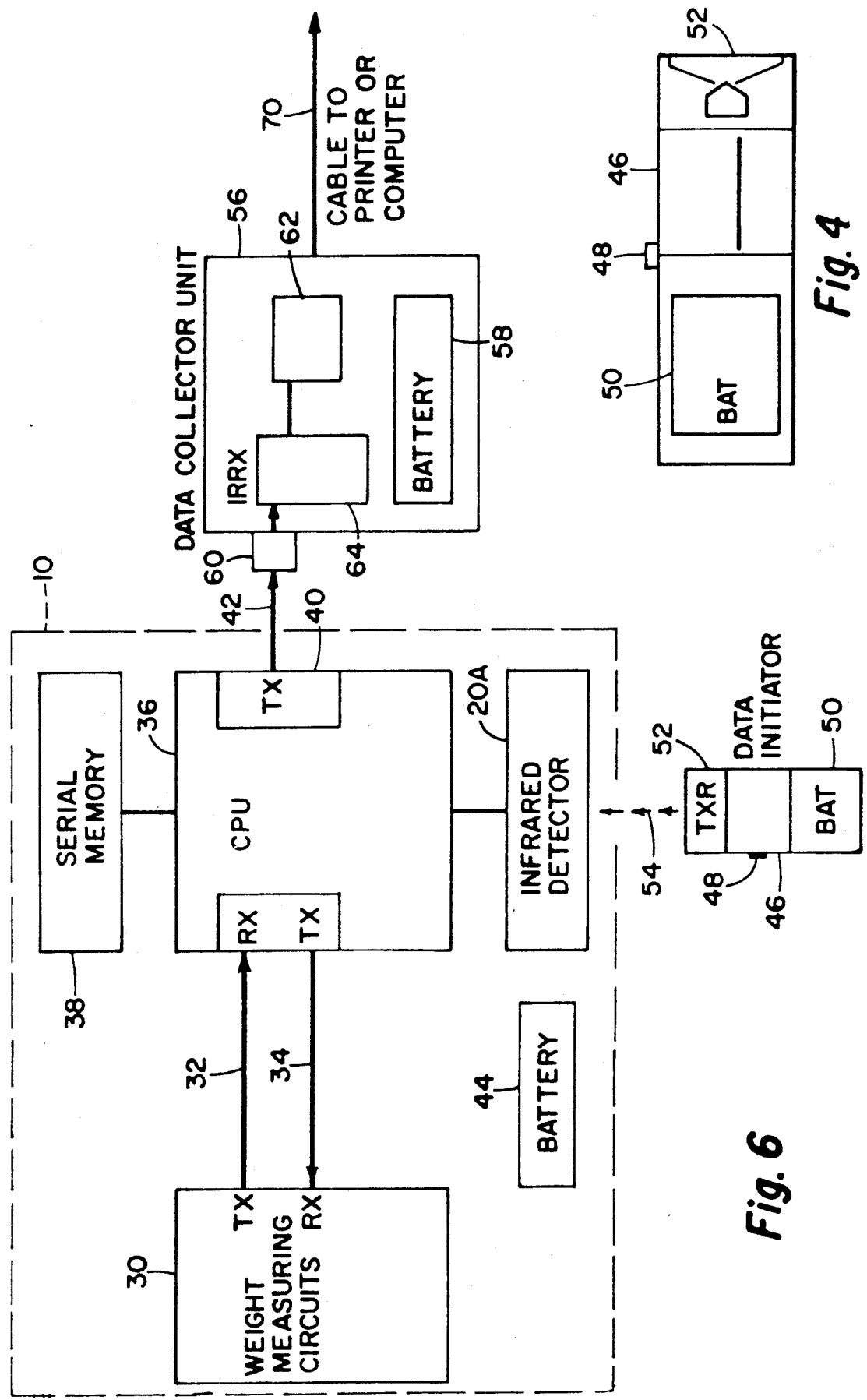

CRANE SCALE LOAD RECORDING DEVICE

SUMMARY OF THE INVENTION

This disclosure relates to an apparatus for simplifying and making more convenient the measurement and maintenance of records of the measurement of sequential loads transported, such as by a crane, fork lift or the like.

It is frequently important in handling material to provide records of the weight of the material handled. For instance, in unloading a cargo wherein the cargo is in the form of a plurality of separate quantities of the material being unloaded, it is necessary that the weight of each load be separately accumulated and this information retained for subsequent usage, such as for totaling the individual loads to arrive at an indication of the total weight of a load which has been transferred.

The use of scales on cranes, fort lifts, and so forth is a known procedure. The problem is that when a crane has a scale thereon, such as of the type which provides a visual indication of the weight being lifted by the crane, it is necessary that the operator first lift the weight so that it can be accurately determined and wait until the weighing process is stabilized and then the stabilized weight must be manually taken from the visually display weight. This process always introduces the possibilty of human error and, in addition, is time consuming. The present disclosure provides a scale having means of internally storing a plurality of separately measured weights, the weights being stored when the weighing mechanism has stabilized upon a signal provided by the operator wherein the operator remains remote from the weighing device and in which the individual stored weights can be subsequentially transferred from the weighing device to a portable data collector unit in a manner wherein no permanent wiring is required from the weighing device to the data collecting unit.

The information transferred from the weighing device to the data collector unit can then subsequentially be utilized, such as for feeding directly into the printer wherein a plurality of individually determined load weights are printed out or the information can be feed from the data collector unit into a computer for permanent or semi-permanent storage and further processing.

The basic elements of the improved scale of this dislosure includes a weight determining element that preferably has a hook at the top and bottom so that it can be easily attached to a crane or other device for supporting a weight and a hook at the bottom for suspending a load thereon. The weight determining element is preferably internally battery powered and therefore is a self-contained unit. The weight determining element may include a visual display and, in addition, the weight determining unit includes other elements, such as a store request window, a rate of transfer probe slot, manual data transfer initiator, an ON/OFF switch, a calibration control, a back light for the display, etc. A separate portable information storage unit is provided having an internal battery and a data input which is compatible with the weight determining element so that, upon actuation, data can be readily transferred from the weight determining element to the information storage unit.

Another element of the improved scale of this disclosure is a hand-held portable data initiator having a self-contained battery therein and a manually operable switch. The data initiator includes a beam transmitter which, upon actuation by the user, transmits a signal receivable by the weight determining element to actuate the entry of the measured weight into the temporary storage within the weight determining element.

The data collector unit may be connected, such as by detachable cable, to a printer or a computer or simultaneously to both so that weight data taken from the weight determining element can be conveyed to the printer and/or the computer.

In use of the device, the operator controls a crane or other weight lifting device in the usual manner, with the weight that is lifted by the crane or other device being registered on the weight determining element. When a weight has been lifted and the weight stabilized to provide an accurate weight indication, such weight can be temporarily recorded in the weight determining element by actuation of the data storage initiator by the operator. This can be accomplished by a hand-held device, such as in the shape of a flashlight, with the data initiator transmitting an electromagnetic beam, such as an infrared beam, that is received by the weight determining element and atuates the circuity within the weight determining element to make a weight measurement and to transfer that measurement to the temporary serial storage memory in the weight determining element. Thereafter, when the individual weights in a sequence have been completed, the data temporarily stored in the weight determining means is easily and quickly transferred into a portable data collection unit which can be physically placed in contact with or adjacent the weight determining element. The serially stored weights in the weight determining element are dumped into the data collection unit. Thereafter, the data collection unit is removed from contact with or adjacent the weight determining unit, and the weight determining unit may be then employed in conjunction with a crane or other apparatus to weight additional loads as the loads are transferred by the crane.

The data collection unit is then physically moveable by the user to a printer or computer and connected to either one or both of the devices so that the weights that have been determined can be printed out or used in a computer for a variety of purposes, such as printing reports of the total number of loads and total quantity of merchandize which has been moved by the crane.

Others have devised ways of weighing and recording information and for background reference to other concepts relating to this general subject matter reference may be had to the following U.S. Pat. Nos. 3,441,099; 3,826,321; 3,965,733; 4,509,376; 4,677,579; 4,839,835; 4,866,255.

A better understanding of the invention will be had by reference to the following description of the preferred embodiments and the claims, taken in conjunction with the attached drawings.

DESCRIPTION OF THE DRAWINGS

FIG. 1 is a front elevational view of a weight determining element which can be employed in a crane or other lifting device and is interposed between the crane lifting apparatus and the weight being lifted. For this reason, a hook is placed at the top and the bottom to provide means of attaching individual weights to the bottom and at the top for attaching the weight determining element to a chain or cable extending from a crane.

FIG. 2 is an elevational side view of the weight determining element of FIG. 1. It is understood that the weight determining element is illustrated as being only one example of a weight determining element and the actual appearance of devices used to practice the concept of this disclosure may be completely different than that illustrated in FIGS. 1 and 2.

FIG. 3 is a composite view showing an enlarged front of the weight determining element of FIGS. 1 and 2 without a hook thereon and showing a weight initiator having an appearance of a typical flashlight used for transmitting an electromagnetic beam, such as an infrared beam, to the weight determining element when the operator wishes a weight measured by such element to be temporarily recorded within the element.

FIG. 4 is a diagrammatic internal view of the weight actuator of FIG. 3.

FIG. 5 shows a portable data storage mean which is utilized for extracting data from the weight determining element and for delivering such extracted data either to a printer or a computer.

FIG. 6 is a block wiring diagram showing the essential elements contained within the weight determining element, the data collector unit the data initiator.

DESCRIPTION OF THE PREFERRED EMBODIMENT

Referring to the drawings and first to FIGS. 1 and 2, a weight determining element is indicated generally by the numeral 10. The weight determining element has an upper eye bolt 12 by which it is supported to a cable, chain, or other mechanism for lifting loads. The bottom of weight determining element 10 has a hook 14 which is used for attachment to loads, such as fishnets, chains around packaged goods, and so forth. Thus, weight determining element 10 is supported in series between a lifting device, such as a crane, and load to be weighed. Such weight determining devices are known and are usually the type which provide a visual readout of the determined weight, such readout can be displayed in window 16.

However, the weight determining element 10 of FIGS. 1 and 2 is different in that it provides a number of other features, some of which have external indications. FIG. 3 shows in large detail the front of weight determining element 10 and some of the externally observable features. An ON/OFF switch is indicated by the numeral 18 and provides means so that by manual engagement, the electronic portion of the weight determining element can be energized or de-energized. Another external visible item, which will be described in greater detail subsequently, is a store request window 20. A data transfer probe slot is indicated by the numeral 22 and will be described subsequently. An additional external feature includes a zero knob 24, a back light adjust knob 26 that controls the brightness of the display in window 16, and a manual data transfer initiator 28, the function of which will be described subsequently.

The weight determining element 10 is utilized in series with a sequence of loads lifted by a crane and includes electronic circuitry, shown in block diagram of FIG. 6. Weight measuring circuits 30 provides means of determining a weight that is suspended on hook 14. Weight determining circuits are known in the industry and are therefore not disclosed in detail herein since such are well within the skill of the practitioner in the weight measuring art, but it can be generally said that the weight measuring circuits 30 provide digital information output on conductor 32 of a weight suspended on hook 14. A data transfer signal can be input into the weight measuring circuits 30 in cable 34.

Contained within the weight determining element 10 is a central processing unit 36 having means to receive cables 32 and 34. The central processing unit includes a serial memory 38 that is used for temporary storage of the sequence of weights determined by weight determining element 10. The central processing unit includes a data transmitter 40 having means for conveying information stored from the serial memory 38 upon command, the data being transferred by the transmitter 40 by means indicated by the numeral 42, such means may be a physically connected probe, or by a photoelectric beam in a manner to be described subsequently.

The weight determining element 10 further has, as indicated in FIG. 6, an internal power supply source 44.

It is important that when a weight is lifted by weight determining element 10 the weight be determined and recorded in serial memory 38 when the weight is stabilized, that is, if the weight is determined as it is being lifted, inertia would cause the apparent weight to be greater than the actual weight, therefore, to accurately determined the weight when a load is lifted by a crane the load must be stabilized, that is, not moving up or down, and this is determined visually by the operator of the crane. It is therefore important that the crane operator determine when a weight measurement is to be made, since he is in position to visually determine that the weight being measured is fully supported by the weight determining element 10 and that the weight is stabilized. For this purpose, the operator has available a data initiator 46 as shown in FIG. 3, the data initiator 46 is shown to have the external appearance of a flashlight, and, indeed, it may be in such configuration. The data initiator includes a switch 48 and includes, internally, as shown in FIG. 6, a battery 50 and a signal transmitter 52. The transmitter 52 may be of the type such as to transmit a beam 54 of electromagnetic radiation, such as infrared light. When the infrared light is directed toward weight determining element 10 and particularly toward store request window 20, the circuitry within central processing unit 36 functions to cause weight measuring circuits 30 to transmit by cable 32 the weight determined to the central process unit which, in turn, transfers the weight to serial member 38. The infrared beam 44 is detected by an infrared detector 20A (see FIG. 6) that is responsive to the store request window 20, as shown in FIG. 3. That is, beam 54 passes through store request window 20 to infrared detector 20A to actuate the central processing unit to convey the weight to serial member 38. In this manner, the operator of the crane may have readily accessible to him a small portable data initiator that when it is appropriate to store a weight, the operator merely depresses switch 48 when the initiator is aimed at store request window 20. Since the weight determining element may be many feet away from the operator, depending upon the type of crane mechanism being used, the use of data initiator 46 eliminates the need of wiring extending from the operator to weight determining element 10.

FIG. 4 shows more details of the data initiator 46.

After a series of weights have been recorded in serial memory 48 within weight determining element 10 such information must be eventually extracted. Obviously, a printer or other apparatus could be employed with weight determining element 10, but it is easy to see that weight determining element 10 is subjected to a great amount of shock and stress as it is moved by the crane operator to engage loads, transport loads and be released from loads in the physical world in which heavy loads are transferred, such as from a ship to a dock or vice versa. For this reason, the present disclosure provides an improved means of extracting the data from that which is temporarily recorded within the weight determining element. This is achieved by the use of a data collector unit 56, as shown in FIGS. 5 and 6. The data collector unit is a portable hand-moveable unit that includes electronic circuitry and internal power source 58. The data collector unit includes a probe 60 that is connectable with the data transfer probe slot 22 (see FIG. 3) of weight determining element 10. Probe 60 may be a physical male-type probe that extends within a socket-type recess 22 to physically engage conductors so that when probe 60 is extended within slot 22, data can be transferred by actuation of the central processing unit 36 to move the data from serial memory 38 into the data storage element 62.

Another means of communicating the data from weight determining element 10 to data collector unit 46 is by use of electromagnetic signals, that is, transmitter 40 within weight determining element 10 may be in the form of a control light transmitter, and probe 60 in the form of a photovoltaic element which receives transmitted light, the light being data modulated so probe 60 picks up information photoelectrically, and in which case a receiving element 62 within the data collection unit functions to interpret the photoelectrical signals and transmits the data carried thereby to data storage element 62.

Therefore, whether the data collector unit obtains the data from weight determining element 10 directly by means of a physical probe or by a light transmitting system, the hand-held data collection unit is utilized to extract the data periodically from the weight determining element.

With the data extracted into data collector unit 56, the operator can then convey such unit to a convenient location, such as an office having a printer 66 or a computer 68 therein as shown in FIG. 5. By means of conductor 70 extending to printer 66 and/or computer 68, the data that has originated with weight measuring circuits 30 within weight determining element 10 is finally placed in an office location wherein such information is used for commercial purposes.

When the operator wishes to extract the data temporarily stored in serial memory 38 within weight determining element 10, the crane operator moves the weight determining element to a convenient location so that the operator can either physically or photoelectrically interconnect data collector unit 56 with weight determining element 10, and the user can then depress manual data transfer initiator button 28 to cause the data within serial memory 38 to be transferred to the data collector unit.

The system provides a convenient method of collecting weight information and for transferring the information to an office location wherein it is used in the normal manner and in which, except for manually operated push buttons or the like, all of the systems in the moveable equipment are solid state and therefore are substantially immune to injury by the rough environment in which weight devices are typically employed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it, is manifest that may changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A scale comprising:
   a weight determining element having means to support the element and means for engaging and suspending a load whereby the weight of a load is measured;
   information storage means within said weight determining element;
   means externally of said weight determining element for initiating the transfer of a measured weight to said information storage means;
   a data storage means external of and separate from said weight determining element;
   means of temporarily interconnecting said weight determining means and said data storage means; and
   means of initiating the transfer of data from said information storage means within said weight determining element to said data storage means when such element and means are interconnected.

2. A scale according to claim 1 wherein said weight determining element is a crane scale.

3. A scale according to claim 1 wherein said weight determining element includes:
   a signal receiving means therein providing means, when energized, to transfer a measured weight to said information storage means; and
   a remote manually operated transmitter means, providing when actuated, said means of initiating the transfer of a measured weight to said information storage means.

4. A scale according to claim 1 wherein said weight determining means includes, on an exterior surface thereof, a tactile responsive means providing said means of initiating the transfer of a measured weight to said information storage means.

5. A scale according to claim 1 wherein said weight determining element has an electromagnetic energy transmitting means therein connected to said information storage means and wherein said data storage means includes an electromagnetic energy receiving means and wherein information is transferred from said weight determining element to said data storage means electromagnetically.

6. A scale according to claim 4 wherein data is transmitted from said weight determining means to said data storage means utilizing infrared radiation.

7. A scale according to claim 1 including a computer; and means to interconnect said data storage means to said computer whereby weights measured by said weight determining means may be transferred to said computer.

8. A scale according to claim 1 including a printer and means to interconnect said data storage means to said computer whereby weights measured by said weight determining means may be printed.

9. A scale according to claim 1 wherein said weight determining means includes weight display means.

* * * * *